US012601551B2

(12) United States Patent
Bock et al.

(10) Patent No.: US 12,601,551 B2
(45) Date of Patent: Apr. 14, 2026

(54) AIR CONDITIONING SYSTEM

(71) Applicant: AUDI AG, Ingolstadt (DE)

(72) Inventors: Florian Bock, Schwaig (DE); Michael Grabowski, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/545,320

(22) Filed: Dec. 8, 2021

(65) Prior Publication Data

US 2022/0228814 A1     Jul. 21, 2022

(30) Foreign Application Priority Data

Jan. 18, 2021   (DE) ........................ 102021100925.1

(51) Int. Cl.
| | |
|---|---|
| *B60H 1/00* | (2006.01) |
| *B60H 3/02* | (2006.01) |
| *F28D 20/00* | (2006.01) |
| *F28D 20/02* | (2006.01) |

(52) U.S. Cl.
CPC ........... *F28D 20/023* (2013.01); *B60H 3/022* (2013.01); *B60H 1/00285* (2013.01); *B60H 1/00295* (2019.05)

(58) Field of Classification Search
CPC ..... F28D 2020/0013; F28D 2020/0017; F28D 2020/0021; F28D 20/02; F28D 20/023; B60H 3/022; B60H 1/00295; B60H 1/00285; B60H 2001/00214; B60H 2001/00221; B60H 2001/00228; B60H 2001/00235; B60H 2001/00242; B60H 1/00492; C09K 5/063
See application file for complete search history.

(56) References Cited

U.S. PATENT DOCUMENTS

| | | | |
|---|---|---|---|
| 2004/0154784 A1 | 8/2004 | Pause | |
| 2005/0191487 A1* | 9/2005 | Magill | ...................... D01F 1/10 |
| | | | 428/375 |
| 2006/0191283 A1* | 8/2006 | Overgaard | ............ F25D 31/007 |
| | | | 222/566 |
| 2008/0230508 A1* | 9/2008 | Overgaard | ................ A45F 3/16 |
| | | | 215/386 |

(Continued)

FOREIGN PATENT DOCUMENTS

| | | |
|---|---|---|
| CN | 201749413 U | 2/2011 |
| CN | 205395718 U | 7/2016 |

(Continued)

OTHER PUBLICATIONS

German Search Report issued on Jul. 29, 2021 in corresponding German Application No. 102021100925.1; 6 pages; Machine translation attached.

(Continued)

*Primary Examiner* — Frantz F Jules
*Assistant Examiner* — Jason N Thompson
(74) *Attorney, Agent, or Firm* — Maier & Maier, PLLC

(57) ABSTRACT

An air conditioning system for an interior of a vehicle, which has at least one cooling unit as at least one component. The at least one cooling unit has thermally conductive composite yarn and carrier material, which has phase change material. The carrier material is woven into the composite yarn. The phase change material is designed to absorb heat from the interior above its melting point.

12 Claims, 1 Drawing Sheet

(56) References Cited

U.S. PATENT DOCUMENTS

| | | | | |
|---|---|---|---|---|
| 2010/0244495 | A1 | 9/2010 | Lawall | |
| 2012/0036880 | A1* | 2/2012 | Anderson | F25D 3/08 |
| | | | | 62/271 |
| 2012/0227926 | A1* | 9/2012 | Field | F24H 7/0441 |
| | | | | 165/157 |
| 2013/0062355 | A1* | 3/2013 | Shulman | B65D 81/3897 |
| | | | | 220/592.01 |
| 2017/0184348 | A1* | 6/2017 | Wu | F28D 20/02 |
| 2018/0283709 | A1* | 10/2018 | Al-Hallaj | F24F 5/001 |
| 2019/0161891 | A1* | 5/2019 | Estreicher | D03D 1/00 |
| 2019/0269548 | A1* | 9/2019 | Fan | C08L 33/02 |
| 2020/0283931 | A1* | 9/2020 | Abouraddy | D01F 1/04 |

FOREIGN PATENT DOCUMENTS

| | | | | |
|---|---|---|---|---|
| CN | 106197116 | A | 12/2016 | |
| CN | 108025617 | A | 5/2018 | |
| CN | 109073328 | A | 12/2018 | |
| CN | 110039974 | A | 7/2019 | |
| CN | 111886370 | A | 11/2020 | |
| DE | 102014209673 | A1 | 11/2015 | |
| DE | 102016006986 | A1 | 12/2017 | |
| JP | 2005282992 | A | 10/2005 | |
| WO | 200283440 | A2 | 10/2002 | |
| WO | WO-2017153693 | A1 * | 9/2017 | B60H 1/00295 |

OTHER PUBLICATIONS

Office Action issued on Jan. 10, 2025, in corresponding Chinese Application No. 202111451533.8, 22 pages.

* cited by examiner

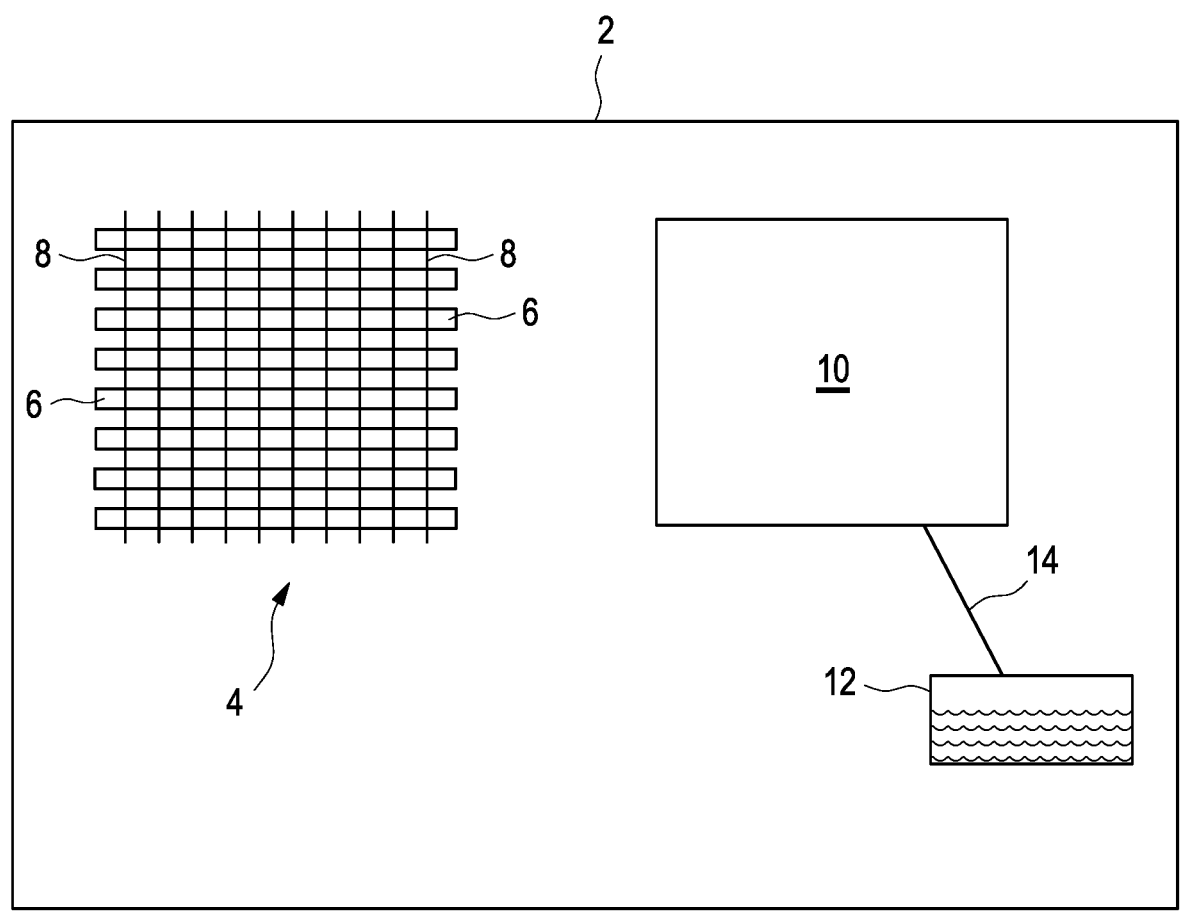

AIR CONDITIONING SYSTEM

FIELD

The invention relates to an air conditioning system and a method for air conditioning an interior of a vehicle.

BACKGROUND

A currently known air conditioning system for a vehicle requires a comparatively large amount of energy to operate, in particular to cool an interior of the vehicle.

Document CN 201749413 U describes a passive cooling device for a computer.

A use of a phase change material for a window of a vehicle is known from document US 2010/0244495 A1.

Document WO 2002/83440 A2 describes a thermal control of an interior of a vehicle using a phase change material.

SUMMARY

Against this background, it was an object to air condition a vehicle in an energy efficient manner.

The air conditioning system according to the invention is designed for an interior of a vehicle and has at least one cooling unit as at least one component. This at least one cooling unit has thermally conductive composite yarn and carrier material which has and/or contains phase change material, usually thermal phase change material, i.e., carrier material having phase change material, wherein the carrier material is woven into the composite yarn. The phase change material is designed to absorb heat from the interior of the vehicle, for example a motor vehicle, above a melting point or its melting point and thus a corresponding melting temperature and to cool this interior when it melts or liquefies above its melting point. The air conditioning system can be designed or referred to as a passive air conditioning system.

In one embodiment, the system has rods made of carrier material that are woven into the composite yarn, wherein each rod has carrier material and phase change material, wherein the phase change material can be bound and/or accommodated in the carrier material.

The phase change material has at least one organic or bio-based fat and/or at least one organic or bio-based fatty acid as at least one fat-like substance. In one embodiment, the phase change material has a mixture made up of the at least one fat and/or the at least one fatty acid and thus of multiple fat-like substances, wherein each fat-like substance has its own melting point or its own melting temperature. A mixture made up of multiple fats and/or fatty acids can have a common melting temperature or can have multiple different melting temperatures in dependence on the contained fats or fatty acids.

However, it is also possible that the phase change material has only one fat-like substance.

The rods having the carrier material can be cylindrical and arranged in parallel adjacent to one another. The rods can also be designed as tubes or pipes and accordingly can be hollow, wherein the at least one fat-like substance is arranged or accommodated in a respective cavity of such a tubular rod, which is enclosed by the corresponding tubular carrier material.

In one embodiment, the air conditioning system has, as at least one further component, at least one air humidifier and a water reservoir for storing water, which are connected to one another via at least one water line for conveying water.

The at least one air humidifier is made of paper clay and is designed to convey water from the water reservoir via a capillary action via the at least one water line from the at least one water reservoir, to evaporate the conveyed water, and to humidify the interior with it.

The water reservoir or a corresponding water container can be designed as a component of the air conditioning system and can only or especially be used for the air conditioning system and/or the method. However, it is also possible to use a water reservoir that is already arranged in the vehicle for this purpose. This can be designed to absorb water or wastewater from a fuel cell as an energy source for the vehicle. It is also possible that such a water reservoir is also used for a windshield wiper system of the vehicle. In such a case, in addition to the water reservoir, the windshield wiper system has at least one additional reservoir or at least one additional container for holding a detergent and/or an antifreeze that is mixed with the water for cleaning at least one window of the vehicle. It is also possible that water, for example, condensation water, from an active air conditioning system of the vehicle is used in the water reservoir and supplied to the at least one humidifier. It is thus possible to provide the at least one air humidifier with pure water, which it can suction out of the water reservoir via the at least one water line due to the capillary action.

At least one component of the air conditioning system, i.e., the at least one cooling unit and/or the at least one air humidifier, is or are arranged on at least one inner wall of an interior of the vehicle and covered with, for example, a textile cover material that is permeable to air and usually is also permeable to water for humidifying the interior. The cover material can also be designed as a component of the air conditioning system. It is possible that the at least one inner wall is designed as a roof lining, as a side wall, for example of a door of the vehicle, or as a pillar. It is possible here for the at least one component of the air conditioning system and the cover material that covers it toward the interior to form an interior covering or wall covering of the vehicle. Alternatively or additionally, at least one component of the air conditioning system is arranged in a seat of the vehicle, for example a support, i.e., a backrest or armrest, a seat surface, or a headrest, and is covered with cover material of the seat.

In one embodiment, at least one fat-like substance, in particular fatty acid, is used, the melting point of which, at which a phase transition from solid to liquid takes place, is in a temperature range or a cooling temperature window between 20° C. and 35° C. If the at least one cooling unit is arranged in the roof and/or on the roof, it is possible to use at least one fat-like substance, in particular fatty acid, the melting point of which is greater than 35° C., wherein a melting temperature of up to, for example, 75° C. can be provided. This takes into consideration the fact that high temperatures of up to 75° C., for example, can occur in the roof or on the roof, usually due to direct sunlight.

At least one possible fatty acid is capric acid, which is found in animal and vegetable fat, undecylenic acid, elaidic acid, which is found in ruminant fat, lauric acid, which is found in milk fat and vegetable fat, myristic acid, which is found in milk fat, fish oil, animal fat, and vegetable fat, palmitic acid which is found in animal fat and vegetable fat, caprylic acid, which is found in milk fat and coconut fat, pelargonic acid, which is found in essential oil, e.g., *Pelargonium roseum*, cheese fat, and fusel oil, oleic acid, which is found in natural fat, or icosenoic acid, which is found in rapeseed oil. Furthermore, at least one other fatty acid can also be used, the melting temperature of which is between 20° C. and 75° C., for example.

In one embodiment, a mixture made up of different fatty acids, that is to say made up of several of the above-mentioned fatty acids, which have different melting temperatures and thus phase transitions in different temperature ranges, can also be used for the phase change material. It is thus possible to set a cooling effect in each case at a melting temperature of a respective fatty acid of the mixture. The mixture made up of fatty acids can have a cooling effect in each case at a first melting temperature of a first fatty acid, for example at 25° C., at a second melting temperature of a second fatty acid, for example at 43° C., and, depending on the number of other fatty acids, at at least an nth melting temperature an nth fatty acid, for example at x° C.

The, for example, rod-shaped carrier material is absorbent and/or porous. The carrier material is designed to absorb or store the at least one fatty acid and thus also fatty acids. The carrier material is, for example, a non-polar organic material. If the carrier material is rod-shaped in the embodiment, corresponding rods in the embodiment are only intended to support the composite yarn, for example for use as wall covering. When the at least one cooling unit is integrated in the wall, for example the roof liner, or in the wall covering of the vehicle, the composite yarn can be incorporated directly into a material of the wall covering. The wall covering made of fabric allows the at least one fatty acid to be permanently introduced into the wall covering, for example into the roof lining, wherein the capillary effect can be used for this purpose. Natural yarn or a synthetic material can be used as the material for the wall covering. It is possible that the composite yarn corresponds to this material and vice versa.

It is furthermore possible that a water distribution system for the air humidifier or a room humidifier is incorporated into the material for the wall covering. This water distribution system comprises the at least one water reservoir and the at least one water line. In this case, the at least one water line is formed, for example, as a thin capillary or capillary tube, which is designed to distribute the water over the wall covering, for example the roof lining, via capillary pressure.

The carrier material is designed for this and accordingly has the function of absorbing the at least one fatty acid. This can be set by a physical interaction between the at least one fatty acid and the carrier material. Two variants are provided for this purpose.

According to a first variant, the at least one fatty acid is introduced into a polymer material as a carrier material by swelling. Fatty acids are non-polar organic substances which have the ability to swell the provided polymer material, wherein the fatty acids are intercalated in the polymer material between existing polymer chains of the polymer material. It is possible here for the polymer material or a corresponding polymer to be present as a fiber composite instead of being present as a non-porous plate.

According to a second variant, the at least one fatty acid is introduced into the carrier material by capillary forces. It is provided here that the carrier material has pores. These pores can be provided via a fiber composite, foam parts, or porous materials as a carrier material. Any material that has pores and is media-resistant in combination with the at least one fatty acid is suitable for this purpose, e.g., a metal, glass, ceramic, a polymer, an elastomer, and/or biomaterial, for example cellulose fibers.

In order to prevent the at least one fatty acid from becoming detached from the carrier material, the size of its pores is set. According to the following formula or the Young-Laplace equation, the Laplace pressure p is inversely proportional to the size r, for example a radius or diameter, of the pores:

$$\Delta p = 4 * \gamma * 1/r$$

Here $\gamma$ is the surface tension of the respective fatty acid. This means that the Laplace pressure p increases from a sufficiently small size r of the pores. The Laplace pressure ensures that the fatty acid is sucked into the pores. If the Laplace pressure is high enough, the fatty acid remains in the carrier material under normal environmental conditions and can only be removed from it by additional measures. Dripping out of the fatty acid is thus prevented with sufficiently small size of the pores.

A polymer can be used as the composite yarn in the polymer matrix of which metallic powder or metallic fibers is or are incorporated, as a result of which the composite yarn becomes thermally conductive. Alternatively or additionally, it is conceivable that metal wires are woven into the composite yarn.

The present invention relates to a method for air conditioning an interior of a vehicle using an air conditioning system, for example an embodiment of the air conditioning system presented, wherein this air conditioning system has at least one cooling unit as at least one component. The at least one cooling unit has thermally conductive composite yarn and rods, for example tubes, made of carrier material having phase change material, wherein the rods are woven into the composite yarn. Using the phase change material, when it reaches a temperature which is above a melting point or its melting temperature, heat is automatically absorbed from the interior.

In one embodiment, the method is carried out using an air conditioning system which has at least one air humidifier and a water reservoir as at least one further component, wherein the at least one air humidifier is formed from paper clay. Using the at least one air humidifier, water is evaporated from the water reservoir, using which the interior is humidified.

Using the passive air conditioning system presented, it is possible to passively air-condition the interior of the vehicle and thus passively cool it. Using the passive air conditioning system or using the passive method for air conditioning, a passive cooling function is provided without active electricity operation, wherein the air conditioning system presented is energy self-sufficient. Thus, in comparison to a conventional air conditioning system, it is not necessary to actively operate the vehicle in order to operate it. It is therefore not necessary, among other things, for a drive unit of the vehicle to have to be actively operated. In order to operate the passive air conditioning system presented, it is therefore not necessary for an internal combustion engine to run as the drive unit and/or for an ignition system of the vehicle to be turned on, which is otherwise necessary, for example, in the case of an electrically driven vehicle (BEV, Battery Electric Vehicle) or a hybrid vehicle, for example a plug-in hybrid vehicle (PHEV, Plug-In-Hybrid Electric Vehicle), to set a cooling function via an air conditioning system. It is also not necessary to provide the passive air conditioning system with electrical energy from an electrical energy storage device, for example a battery, of the vehicle in order to operate it. Accordingly, no battery capacity is required for the passive air conditioning system.

The air conditioning system accordingly comprises at least one passive cooling unit which is integrated into the interior, typically into an inner wall of the vehicle, and/or is arranged on the inner wall. The at least one cooling unit is designed to carry out or take over a certain cooling function at any point in time, even after the vehicle has been parked. It is thus possible to precool the vehicle or its interior in a climate-neutral manner for an occupant or customer.

In addition to the at least one passive cooling unit, the at least one air humidifier is also designed to be passive, since it also functions without electrical power. In one embodiment, the at least one woven cooling unit can be designed as a ceiling module on the at least one inner wall. The at least one cooling unit consists of extremely thermally conductive composite yarn into which the rods made of the carrier material and the phase change material (PCM) are woven. The typically bio-based fatty acids that form the phase change material melt, for example, at a melting point or melting temperature of approximately 25° C. and absorb heat from the interior during liquefaction.

The at least one humidifier, on the other hand, is made of paper clay and uses capillary action to absorb water from the water reservoir. It is provided that the water reservoir is arranged below the at least one air humidifier with respect to a vertical axis of the vehicle, wherein the water from the water reservoir is conveyed upwards against gravity due to the capillary action of the at least one air humidifier. The water evaporates on its way up to the at least one air humidifier and humidifies the interior of the vehicle.

The at least one cooling unit can be designed, for example, as a roof lining and thus as the interior covering of the vehicle. Furthermore, it is also possible to arrange the at least one cooling unit in a lateral inner wall or in a seat of the vehicle. It is possible that the at least one cooling unit replaces an otherwise provided interior covering or wall covering of the interior of the vehicle. The at least one cooling unit is covered with leather or textile material or a textile fabric that is permeable to air and water.

The at least one component of the air conditioning system is designed, for example, as the interior covering of a door and/or a pillar, for example an A-pillar, B-pillar and/or C-pillar, of the vehicle. It is also possible to arrange the at least one component of the air conditioning system in a cockpit crossbeam of the vehicle.

The climate-neutral and passive air conditioning system presented for performing the intended cooling function can replace an already existing active air conditioning system of the vehicle. It is also possible for this active air conditioning system to be dimensioned smaller if necessary, if the passive air conditioning system is also arranged in the vehicle. When air conditioning the interior using the passive air conditioning system presented, it is possible to save fuel for driving the vehicle, battery capacity, and other resources. This makes it possible to design the vehicle to be sustainable and to make a contribution to climate goals. In addition, comfort is increased for an occupant or driver of the vehicle, since the interior can be pre-cooled using the passive air conditioning system at any time. From an ecological point of view, a cooling effect or cooling function of the passive air conditioning system also does not compete with a draft that results when the vehicle is driven with the windows open.

It is possible that the cooling unit covered with the covering material is designed or can be designated as a cooling ceiling. If the at least one cooling unit is arranged on and/or in the roof liner below the roof of the vehicle, it is possible that cool or cold air from the at least one cooling unit, starting from the ceiling, flows downward into the interior and past the occupant due to its low density. A cooling felt by the occupant is thereby increased. The passive air conditioning system presented is suitable, for example, for an at least partially electrically powered vehicle, i.e., an electric vehicle or hybrid vehicle, since the operation of the passive air conditioning system has no negative influence on the range of the vehicle, since no electrical energy from the battery is required for this purpose, wherein a consumption of this electrically powered vehicle is not increased although the interior thereof is cooled.

The at least one air humidifier of the passive air conditioning system presented is formed from paper clay, which is also referred to or can be designed as paper clay. The paper clay is a mixture of usually mineral clay and a fiber pulp made of paper and/or rags. To produce the at least one air humidifier, it is provided that water is dissolved in the mixture of clay and fiber pulp. It is thus possible to mold or model the mixture, which is initially still moist, as required. It is furthermore provided that the paper clay is dried and the water initially still located therein is removed.

As in the case of the fatty acids, a polar liquid, for example water, is used to provide a respective air humidifier. Polar liquids can swell polar materials but also polymers having polar components. Metals are also suitable for this purpose, wherein when selecting a metal it has to be taken into consideration, however, that it can oxidize in combination with water and thus rust, because of which an alloy, for example stainless steel, can be used for this purpose. Noble metals are usually too expensive, but an air humidifier which has stainless steel would be conceivable in one possible embodiment. For the air humidifier, a material that is inert with respect to water can be effectively used, e.g., biofibers, plastic fibers, or polymer foam, wherein the water is stored in the material for the air humidifier via a capillary effect.

It is provided that the rods, which comprise the carrier material and the phase change material, of each cooling unit are woven into fibers made of thermally conductive composite yarn. It is possible that the cooling unit has multiple strips or bands made of the composite yarn, wherein each two directly adjacent rods are alternately enclosed by a strip or band of composite yarn, wherein one strip made of composite yarn is or will be shaped according to a trigonometric function, for example according to a cosine function or sine function, if it alternately encloses multiple such rods. The strip alternately forms peaks and valleys according to the periodic function. Two strips of composite yarn arranged directly adjacent to one another are usually offset from one another in terms of their periodicity, wherein a first strip encloses a rod on a first side and the second strip encloses the respective rod on a second side of the rod, which is opposite to the first side.

A peak of the first strip is arranged next to a valley of the second strip arranged directly adjacent to it, or a valley of the first strip is arranged next to a peak of the directly adjacent second strip.

The passive air conditioning system, in particular its at least one cooling unit, is designed to absorb warmth or heat from the interior of the vehicle and thus to reduce a temperature in the interior. It is possible to use the passive air conditioning on a warm day, for example in summer. A respective cooling unit at least partially covers an inner wall of the vehicle. The phase change material, which is arranged, for example, within a respective rod or tube, is designed to absorb the heat. It is possible that the phase change material changes its color, wherein it is possible that it becomes lighter, for example transparent, the higher its temperature is.

Furthermore, it is possible that the initially, for example, white carrier material and thus the initially, for example, white rods also become colored, for example, blue, when the phase change material liquefies and absorbs heat from the interior. If the temperature in the interior drops and a temperature of the phase change material drops below the melting point or the melting temperature, it will solidify again. In this case it is possible that the carrier material or the rods become white again. The phase change material absorbs the heat when it comes into contact with air and in the process forms a barrier to heat from the surroundings of the vehicle, wherein a respective cooling unit prevents the heat from penetrating into the interior. It is thus possible to maintain a temperature difference between warm surroundings of the vehicle and the interior, wherein the interior is cooler than the surroundings since it is thermally separated from the surrounding by the at least one cooling unit. It is possible that the cooling unit is activated automatically depending on the difference in temperature between the surroundings and the interior.

It is apparent that the above-mentioned features and the features still to be explained hereinafter are usable not only in the particular specified combination but rather also in other combinations or alone, without leaving the scope of the present invention.

BRIEF DESCRIPTION OF THE FIGURES

The invention is illustrated schematically in the drawing on the basis of embodiments, and will be described schematically and in detail with reference to the drawing.

FIG. 1 shows a schematic illustration of an embodiment of the air conditioning system according to the invention for carrying out an embodiment of the method according to the invention

DETAILED DESCRIPTION

FIG. 1 shows a schematic illustration of a vehicle 2 designed as a motor vehicle, which has the embodiment of the air conditioning system according to the invention. The air conditioning system, which is passive here, has a cooling unit 4 as a first component, which is arranged on an inner wall of the vehicle 2, wherein this inner wall delimits an interior of the vehicle 2. The cooling unit 4 has multiple rods 6 arranged in parallel to one another, wherein each rod 6 has carrier material and phase change material made from at least one fatty acid, wherein the phase change material is accommodated in the carrier material. These rods 6 are woven into fibers made of composite yarn 8, wherein these fibers of the composite yarn 8 are oriented here perpendicularly to the rods 6 made of carrier and phase change material.

It is provided that the at least one fatty acid of the rods 6 has a melting temperature or a melting point of 25° C., for example. In the embodiment of the method according to the invention, it is provided that the at least one fatty acid of the cooling unit 4 absorbs heat from the interior and thus cools it down in the case that a temperature in the interior of the vehicle 2 and/or in the surroundings of the vehicle 2 is greater than the melting point. The cooling unit 4 also acts at or on the inner wall as a thermal barrier with respect to the surroundings of the vehicle 2. The cooling unit 4 is also covered using cover material that separates the cooling unit 4 from the interior.

In addition, the embodiment of the air conditioning system has an air humidifier 10 as a second component, which is connected to a water reservoir 12 or a water container via a water line 14. The air humidifier 10 consists of paper clay and is designed to convey water from the water reservoir 12 due to a capillary action, wherein the interior is humidified with the water by the air humidifier 10. In one embodiment, it is possible that the water reservoir 12 is also used for other applications in the vehicle 2 at the same time. It is thus possible for the water reservoir 12 to be used for wiper water from a windshield wiper system, to collect condensed water from another active air conditioning system, or to collect water from a fuel cell of the vehicle 2.

LIST OF REFERENCE SIGNS 2 vehicle
4 cooling unit
6 rod
8 composite yarn
10 humidifier
12 water reservoir
14 water line

The invention claimed is:

1. A passive air conditioning system for an interior of a vehicle, comprising:
   a water reservoir coupled to an active air conditioning system of the vehicle; and
   at least one cooling unit, wherein the at least one cooling unit has thermally conductive composite yarn, and a plurality of rods having a carrier material and a phase change material made of at least one bio-based fatty acid, wherein the plurality of rods is woven into the thermally conductive composite yarn and oriented perpendicular thereto, the carrier material changes color from white to blue when the phase change material transitions from a solid state to a liquid state and from blue to white when the phase change material transitions from the liquid state to the solid state, the phase change material absorbs heat from the interior of the vehicle above a melting point of approximately 25° C. of the at least one bio-based fatty acid, and the phase change material is located within pores of the carrier material.

2. The passive air conditioning system as claimed in claim 1, further comprising:
   at least one air humidifier, wherein the at least one air humidifier is formed from paper clay and configured to evaporate water from the water reservoir and humidify the interior of the vehicle.

3. The passive air conditioning system as claimed in claim 2, wherein the at least one air humidifier is configured to convey water out of the water reservoir via a capillary action.

4. The passive air conditioning system as claimed in claim 3, wherein the at least one cooling unit is arranged on at least one inner wall of an interior of the vehicle and is covered using cover material.

5. The passive air conditioning system as claimed in claim 3, wherein the at least one cooling unit is arranged in a seat of the vehicle and is covered using cover material.

6. The passive air conditioning system as claimed in claim 2, wherein the at least one cooling unit is arranged on at least one inner wall of an interior of the vehicle and is covered using cover material.

7. The passive air conditioning system as claimed in claim 2, wherein the at least one cooling unit is arranged in a seat of the vehicle and is covered using cover material.

8. The passive air conditioning system as claimed in claim 1, wherein the at least one cooling unit is arranged on at least one inner wall of an interior of the vehicle and is covered using cover material.

9. The passive air conditioning system as claimed in claim 8, wherein the at least one cooling unit is arranged in a seat of the vehicle and is covered using cover material.

10. The passive air conditioning system as claimed in claim 1, wherein the at least one cooling unit is arranged in a seat of the vehicle and is covered using cover material.

11. A method for passively air conditioning an interior of a vehicle using an air conditioning system, with at least one cooling unit, wherein the at least one cooling unit has thermally conductive composite yarn, and a plurality of rods having carrier material and a phase change material made of at least one bio-based fatty acid, the plurality of rods is woven into the thermally conductive composite yarn and oriented perpendicular thereto, the carrier material changes color from white to blue when the phase change material transitions from a solid state to a liquid state and from blue to white when the phase change material transitions from the liquid state to the solid state, the phase change material absorbs heat from the interior above a melting point of approximately 25° C. of the at least one bio-based fatty acid, the phase change material is located within pores of the carrier material, and a water reservoir is coupled to an active air conditioning system of the vehicle.

12. The method as claimed in claim 11, further comprising at least one air humidifier and a water reservoir, wherein the at least one air humidifier is formed from paper clay, wherein the interior is humidified with water evaporated from the water reservoir using the at least one air humidifier.

\* \* \* \* \*